March 27, 1951   R. L. McELROY   2,546,554
REVERSIBLE DISK PLOW
Filed March 8, 1949   3 Sheets-Sheet 1
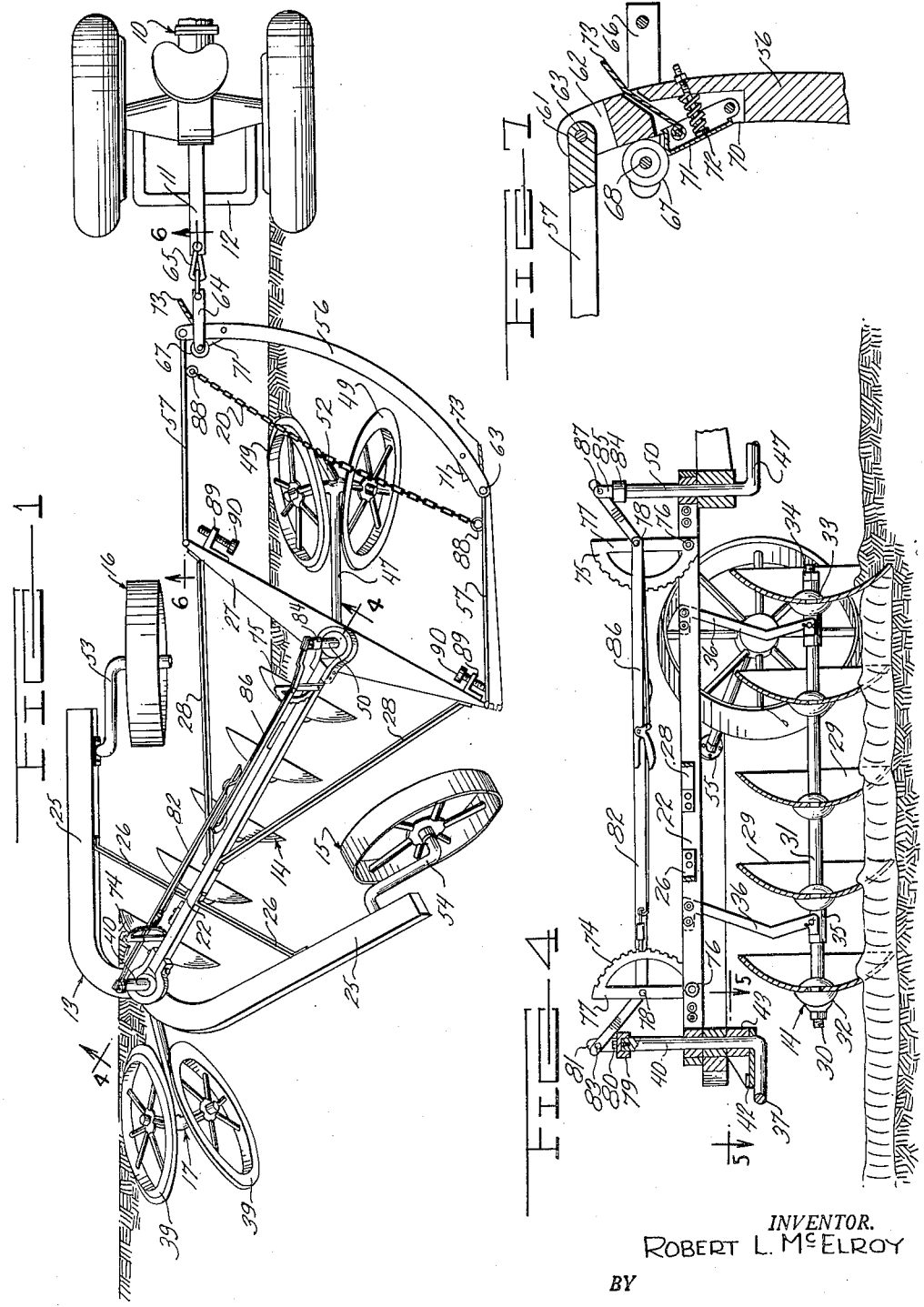
INVENTOR.
ROBERT L. McELROY
BY
McMorrow, Berman & Davidson
ATTORNEYS

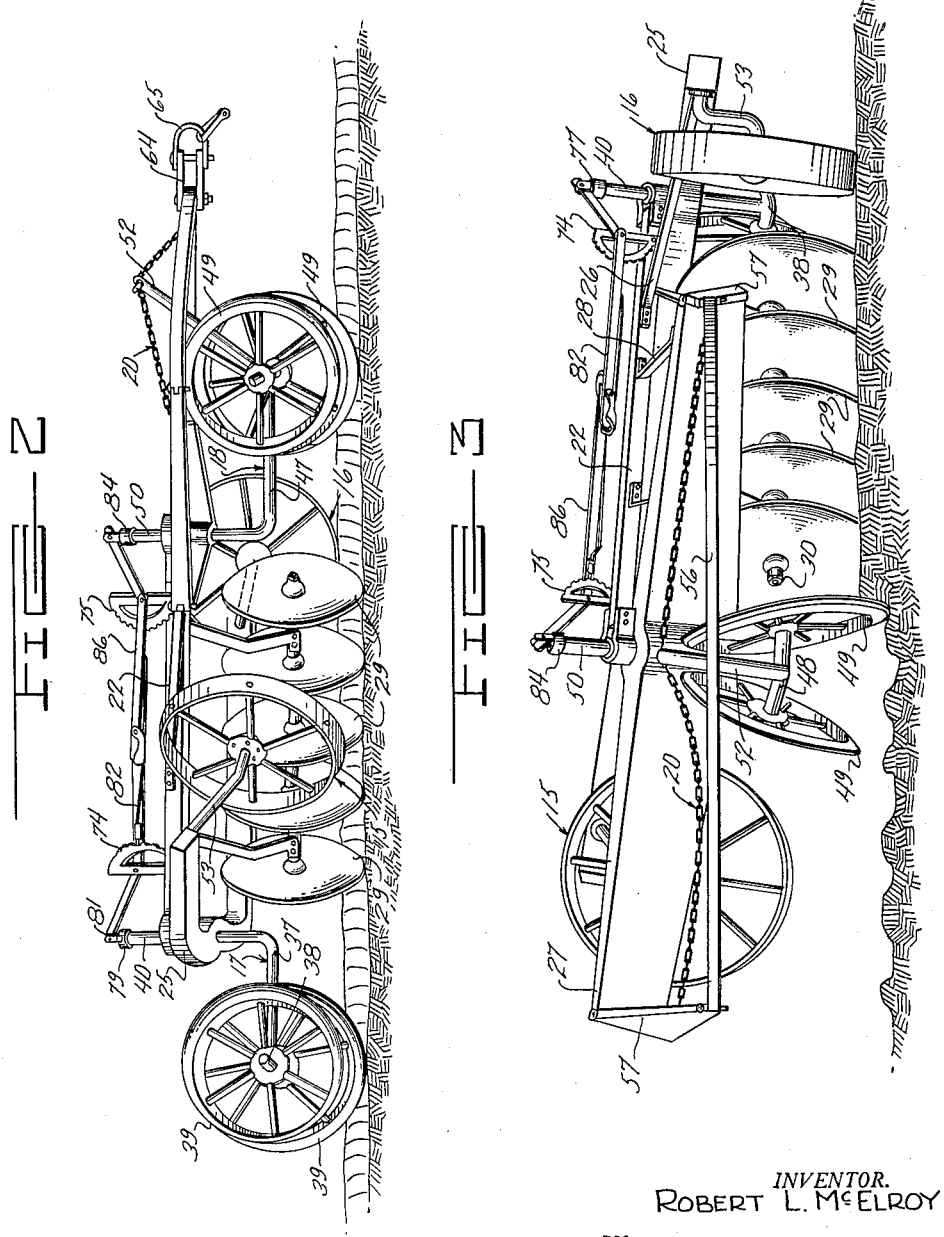

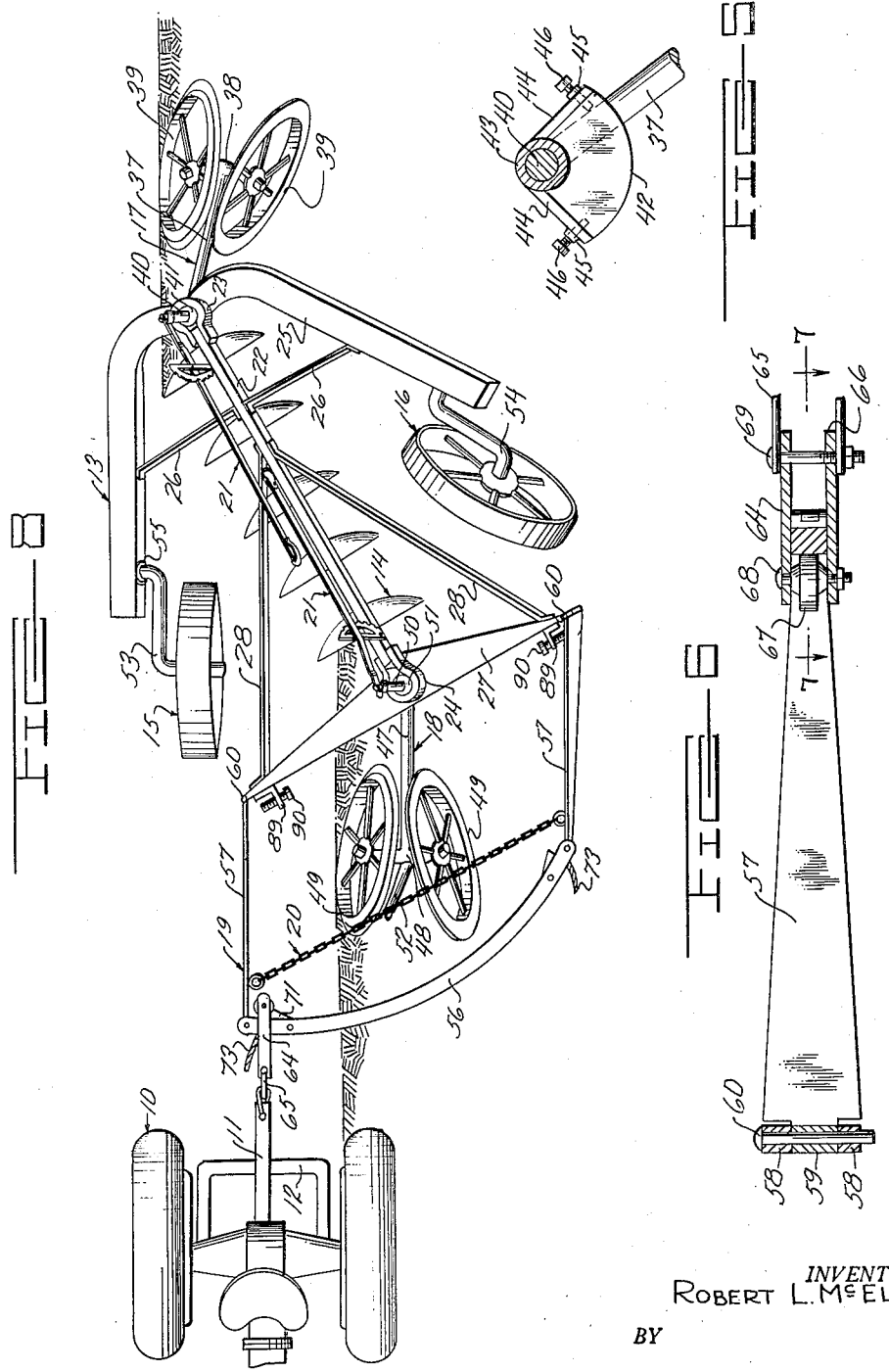

Patented Mar. 27, 1951

2,546,554

UNITED STATES PATENT OFFICE 2,546,554

REVERSIBLE DISK PLOW

Robert L. McElroy, Belton, Tex.

Application March 8, 1949, Serial No. 80,289

12 Claims. (Cl. 97—32)

1

This invention relates to disc plows of the so-called, "one-way" type, and more particularly to a reversible disc plow which can be operated to displace earth in the same direction as it passes in opposite directions across a field or other area.

The "one-way" type of disc plow has come into extensive use in those areas of the country where the land is subject to sheet erosion and excessive drying and blowing, as such a plow tends to mix stubble and other crop remnants with the top soil and leaves a sufficient amount of such plant material on the soil to check erosion and conserve moisture in the soil. They are also used on terraced land and for contour plowing on sloping land since, unlike the ordinary disc or disc harrow, which has two gangs of discs disposed in end-to-end relationship and disposed at an angle to each other, so that they displace the earth in respectively opposite directions, the "one-way" plow has only one disc gang and displaces the earth in only one direction, and hence, does not leave a depression or water furrow, such as the disc harrow leaves at the adjacent ends of the two angularly related disc gangs, the side reaction to the single disc gang of the "one-way" plow being taken by suitable guide and supporting wheels.

Such a "one-way" disc plow can be used to displace all of the earth moved thereby in the same direction as long as the plow can be continuously moved in the same direction across a field, and to constantly move such earth in an uphill direction, if the plow can be continuously moved in the same direction across a slope, as in plowing around a hill or along opposite sides of a depression between two slopes. Such conditions, however, are extremely rare, and it is usually necessary to pass the plow back-and-forth across a field or along a terrace. Under these conditions the conventional one-way disc plow will move the earth in respectively opposite directions in accordance with its opposite directions of travel, and a depression or water furrow will be left where the two areas of oppositely-displaced earth join. It is also impossible, or at least impracticable, under such conditions to displace all of the earth in an uphill direction in conformity with accepted soil conservation practices.

It is, therefore, among the objects of the present invention to provide a one-way disc plow which can be reversed at the end of each passage across a field or along a terrace or other area, so that the plow will displace earth in the same direction regardless of its direction of travel across a field or along a terraced or other culti-

2 vatable area, which utilizes a single disc gang and duplicate guide and supporting wheels, so that the operation of the discs is exactly the same for both directions of travel of the plow, which is automatically reversed by the turning of the tractor and plow assembly at the ends of the passages of such assembly across a field or other area, which is automatically tilted upon being reversed, so that a supporting wheel will rest, at all times, on unplowed land at the side of the plow from which the earth is moved by operation of the plow, and so that guide wheels having the proper inclination and direction to effectively resist the tendency of the plow to move sideways, will be placed in the furrows at the opposite sides of the plow, which is easily steered by the towing tractor, which includes means for raising and lowering the disc gang so that the plow can be moved from place to place with the discs raised out of contact with the ground and the operating depth of the discs in the ground can be regulated, and which is simple and durable in construction, extremely economical to manufacture, and easy to use.

Other objects and advantages will become apparent from a consideration of the following description and the appended claims in conjunction with the accompanying drawings, wherein:

Figure 1 is a top plan view of a reversible disc plow illustrative of the invention, a fragmentary rear portion of a plow-towing tractor also being shown in plan view;

Figure 2 is a side elevation of the plow illustrated in Figure 1, looking at that side of the plow corresponding to the bottom of Figure 1;

Figure 3 is an elevational view of the front end of the plow illustrated in Figure 1;

Figure 4 is a transverse cross-section along the line 4—4 of Figure 1;

Figure 5 is a substantially horizontal cross-section on the line 5—5 of Figure 4;

Figure 6 is a longitudinal cross-section of a fragmentary portion of the plow and the associated tractor hitch on the line 6—6 of Figure 1;

Figure 7 is a longitudinal cross-section on the line 7—7 of Figure 6; and

Figure 8 is a top plan view similar to Figure 1, but showing the plow reversed from its condition illustrated in Figure 1, and traveling in the opposite direction from the direction shown in Figure 1.

With continued reference to the drawings, the tractor, generally indicated at 10, may be any conventional farm tractor having sufficient power to pull the plow and is equipped with a rearwardly-extending, hitch bar 11 supported on a rearwardly-extended drawbar 12.

The plow comprises, in general, a frame 13, a disc gang 14 supported below the frame and extending longitudinally of the latter for rotation about its own longitudinal axis, two frame-supporting ground wheels 15 and 16 disposed at respectively opposite sides of the frame, a rear guide wheel truck 17 pivotally connected at its front end to the rear end of the frame and extending rearwardly from the latter, a front guide wheel truck 18 pivotally connected at its rear end to the front end of the frame and extending forwardly from the latter, a quadrilateral hitch structure 19 extending forwardly from the front end of the frame and having pivotally interconnected sides, flexible means 20 connecting the front guide wheel truck 18 to the hitch structure for steering the truck, and means 21 for raising and lowering the disc gang relative to the trucks 17 and 18.

The frame 13 comprises a straight, elongated center bar 22 having respective bearing eyes 23 and 24 at its rear and front ends, respectively, a substantially U-shaped rear frame member 25 connected at its mid-length location to the under side of the rear bearing eye 23 with its legs extending forwardly along and spaced from the center bar 22 to positions substantially in line with the mid-length location of the center bar. The rear frame member 25 is symmetrically disposed relative to the center bar, and is rigidly held in position relative to the latter by suitable braces 26 extending between the center bar 22 and the respective legs of the rear frame member. The frame further includes a front, transverse frame member 27 secured at its mid-length location to the under side of the front bearing eye 24, and a pair of diagonal braces 28 extending respectively from the opposite ends of the front frame member 27 to the center frame member 22 at a location intermediate the length of the latter and holding the front frame member in a position substantially perpendicular to the center member 22.

The disc gang 14 comprises any desired number of spaced-apart concavo-convex plow discs 29 provided with central apertures receiving a shaft 30 upon which the discs are mounted, the discs being held in mutually aligned, sequentially arranged relationship to each other and substantially perpendicular to the shaft by suitable spacing sleeves 31 interposed between adjacent discs, abutment collars 32 and 33 mounted on the shaft 30 at the outer sides of the end discs, and nuts 34 threaded respectively on the opposite screw-threaded ends of the shaft 30 and bearing against the abutment collars 32 and 33. Suitable bearing blocks 35 are mounted on the spacing sleeves nearest the opposite ends of the disc gang, and suitable struts 36 extend upward respectively from the bearing blocks 35 to the frame center bar 22 to rigidly secure the disc gang to the center bar for rotation of the disc gang about an axis coinciding with the longitudinal center-line of shaft 30.

The rear truck 17 comprises an elongated tongue 37, and axle 38 extending transversely of the rear end of the tongue substantially symmetrically of the latter, and a pair of guide wheels 39 journaled respectively on the opposite ends of the axle 38. At its front end the tongue 37 is provided with an upstanding portion 40 which is disposed substantially at right angles to the remainder of the tongue and projects upwardly through an aperture in the mid-length portion of the rear frame member 25 and through a bearing sleeve 41 secured in the rear bearing eye 23. The two halves of the axle 38, at opposite sides of the rear end of tongue 37, are angularly related to each other, so that the two rear guide wheels 39 are inclined symmetrically toward each other from their bottom to their top edges and are also toed in or convergently inclined from their rear to their front edges. A sector-shaped plate 42 is secured to the under side of the rear frame member 25, and provided with an apertured boss 43 which receives the upstanding portion 40 of the tongue 37, and is in alignment with the tongue-receiving aperture in the rear frame member. This plate is provided along its opposite sides with respective depending flanges 44 provided near their outer ends with respective internally screw-threaded, apertured bosses 45 through which respective set screws 46 are threaded to engage the corresponding sides of tongue 37 and limit swinging movements of the tongue relative to the plow frame for a purpose which will be later explained.

The front truck 18 has a tongue 47, and axle 48 extending transversely of the tongue intermediate the length of the latter, and a pair of guide wheels 49 journaled on respective opposite ends of the axle. The tongue 47 has, at one end, an upstanding portion 50 disposed substantially at right angles to the portion of the tongue between such upstanding portion and the axle 48, which upstanding portion extends through an aperture in the front frame member 27 at the mid-length location of the latter, and through a bearing sleeve 51 secured in the front bearing eye 24. At the side of the axle 48 opposite the upstanding portion 50, the tongue is provided with an upwardly-inclined portion 52 provided near its upper end with an aperture for the connection thereto of the flexible element 20. This flexible element is preferably a link chain, but may be a rope, cable, or other flexible strand, if desired.

The front truck axle 48 is substantially straight and perpendicular to the tongue 47, but its portions at opposite sides of the tongue have a slight angularity relative to each other, so that the front guide wheels 49 are upwardly inclined toward each other and are forwardly divergent.

All of the guide wheels 39 and 49 have narrow, and preferably beveled tires, so that they obtain a good bearing with the land at the steep sides of the plowed furrows to resist a force tending to move the plow laterally which is the reaction to the earth-displacing action of the discs 29.

The two frame-supporting land wheels 15 and 16 are broad, tired wheels, and are journaled on the ends of respective Z-shaped axle arms 53 and 54. The two axle arms 53 and 54 each have end portions disposed substantially at right angles to the intermediate portion thereof with the respective wheel journaled on one such end portion, and the other end portion secured by a suitable faceplate 55 to the adjacent arm of the rear frame member 25, the location of these supporting wheels being near the front end of the frame center bar 22.

The towing structure 19 comprises a curved tow bar 56 which is generally parallel to the front frame cross-member 27, and is connected at its opposite ends to the corresponding ends of the frame member 27 by respective links 57 of substantially equal length. The links 57 taper in width from their ends connected to the frame cross-member 27 to their ends connected to the curved tow bar 56, and each link is connected at its wider, rear end to the corresponding end of the frame member 27 by a hinge connection including a pair of spaced-apart lugs 58 on the corresponding end of the frame member, a lug 59 at the end of the link disposed between the lugs 58, and a hinge pin 60 extending through the lugs 58 and 59. At their front ends the links are provided with respective lugs 61, see Figure 7, received in respective recesses 62 provided at the opposite ends of the tow bar 56, and respective hinge pins 63 extend through apertures provided in the tow bar at opposite sides of the recesses 62 and through the respective lugs 61 of the links to pivotally connect the front ends of the links to the tow bar at respectively opposite ends of the latter.

The axes of the hinge pins 60 are skewed, or inclined forwardly and outwardly relative to the respective ends of the frame cross-member 27. The angularity of the hinge pins is such that when the links are swung outwardly relative to the front frame member, the front ends of the links tend to rise. If this tendency of the front ends of the links to rise is prevented, the corresponding ends of the frame member 27 will be forced downwardly and the entire frame will be tilted in the corresponding direction.

The tractor is connected to the curved tow bar 56 by a hitch 64 connected at its front end to the rear end of the tractor hitch bar 11 by a clevice 65, or other suitable, pivotal connecting means. The hitch 64 comprises a pair of spaced-apart, apertured plates 66 disposed one above, and one below the tow bar 56. A roller 67 is disposed between the plates 66 at the inner or rearward side of the tow bar, and bears against the rear face of the curved tow bar. This roller is rotatably connected to the plates 66 by a pin or bolt 68 which extends through apertures in the plates near the rear ends of the latter, and through a central aperture in the roller 67. A pin or bolt 69 extends through apertures provided in the plates 66 near their front ends and through the end eyes of the clevice 65 by which the hitch is connected to the tractor hitch bar.

Recesses 70 are provided in the tractor hitch bar opening to the rear face of the bar near the opposite ends, of the latter, and respective locking dogs 71 are pivotally mounted in these recesses, and are engageable with the roller 67 to releasably hold the roller near either end of the hitch bar. The dogs 71 are resiliently urged outwardly to roller-engaging position by respective compression springs 72 and are retractible to release the roller by respective pull cords 73 which extend from the dogs through the tow bar 56, and are led to a position convenient to the operator of the tractor 10.

Suitable means are provided for raising and lowering the disc gang 14 relative to the frame 13 which means may conveniently take the form of hand-operated levers, as particularly illustrated in Figure 4, although various other lift devices, either hand or power-operated, may be utilized without, in any way, exceeding the scope of the invention.

In the arrangement illustrated, two similar quadrant brackets 74 and 75 are pivotally connected at their lower ends to the frame center member 22 near respectively opposite ends of the lattter by suitable means, such as the pivot pins or bolts 76. These two quadrant brackets extend upwardly from the frame center member, and are provided with respective diametrically-disposed bars 77, which are centrally apertured to receive respective pivot pins 78. A hollow cap 79 is rotatably mounted on the top of the upstanding portion 40 of the rear axle 37 by the cap screw 80 which extends through an aperture in the end wall of the cap and into a screw-threaded well provided in the top end of the tongue portion 40. The cap 79 is provided with a pair of spaced-apart, upstanding lugs 81 provided with aligned apertures, and an elongated hand lever 82 is pivotally connected, intermediate its length, to the quadrant bracket 74 by the pin 78 and is pivotally connected near one end to the lugs 81 of the cap 79 by a pivot pin 83. With this arrangement, when the free end of the hand lever 82 is manually raised, the rear end of the frame center member 22 will be raised upwardly along the upstanding portion 40 of the tongue 37 of the rear truck, thereby elevating the rear end of the disc gang 14.

A cap 84, similar to the cap 79, is pivotally secured to the upper end of the upstanding portion 50 of the front truck tongue 47, and is provided with upstanding, apertured lugs 85. An elongated hand lever 86 is pivotally connected intermediate its length to the quadrant bracket 75 by the pivot pin 78 and is pivotally connected near one end to the lugs 85 by pivot pin 87. Manual raising of the free end of lever 86 will raise the front end of the frame relative to the front truck 18, and will thus elevate the front end of the disc gang. Both levers 82 and 86 carry spring-pressed, manually-retractible detents engageable with the teeth of the quadrant brackets to hold the frame and disc gang in any desired position of elevation relative to the front and rear guide wheel trucks, and the disc gang may be raised until it is entirely above the ground for movement of the plow from place to place without having the discs engage the ground, and the levers may also be adjusted to provide the desired operating depth of the discs in the ground.

The opposite ends of the chains 20 are connected respectively to the links 57 near the front ends of the latter, by suitable means, such as respective rings 88 attached to the inner sides of the links, and two angle brackets 89 are secured to the front side of the front frame member 27 near respectively opposite ends of the frame members, and each of these brackets is provided in its upstanding leg with a screw-threaded aperture which receives a respective set screw 90 directed outwardly to bear, at its outer end, against the inner side of the adjacent link 57 to limit swinging movements of the links relative to the front frame member.

Assuming that the tractor-and-plow assembly is moving in the direction illustrated in Figure 1, it will be noted that the left-hand frame-supporting ground wheel 16 is in contact with the unplowed ground immediately ahead of the disc gang 14, and that the wheel is disposed to the left of the disc gang with the corresponding left-hand leg of the rear frame member 25 substantially parallel to the draft line from the tractor to the plow. The left-hand guide wheel 39 of the rear truck 17 is in engagement with the side of the furrow provided by the rear disc of the disc gang, and is inclined upwardly and forwardly away from the side of the furrow, so that it does not tend to climb out of the furrow due to the pressure exerted on it by the side force of the plow. The tongue will be in engagement with the right-hand set screw 46 of the stop bracket, and the right-hand rear guide wheel 39 is in elevated position out of contact with the plowed land therebeneath. The right-hand leg of the rear frame member 25 is directed outwardly from the draft line between the tractor and the plow, and the right-hand ground wheel 15 is raised above the ground to temporarily inoperative position.

The left-hand front guide wheel 49 is in engagement with the steep side of the furrow left by the preceding passage of the plow, while the right-hand front guide wheel is elevated to an inoperative position above the plowed land therebeneath. The portion of the chain 20 between the right-hand link 57 and the upwardly-inclined portion 52 at the front end of the front truck tongue 47 is taut as the left-hand front guide wheel is resisting the tendency of the front end of the disc gang to move to the left by a force transmitted in tension through this portion of the chain. The right-hand link 57 will be against the set screw 90 of the adjacent bracket 89, so that it cannot swing any further toward the front frame member 27.

The roller 67 is near the left-hand end of the curved tow bar 56 and is releasably held in that position by the left-hand latch dog 71. Under these conditions, the draft line extends rearwardly from the tractor hitch bar 11 to a location at or near the pull center of the disc gang 14, and the disc gang is held at a predetermined acute angle to the draft line, so that the several discs cut consecutive furrows, forcing the earth toward the right-hand side of the plow, the furrow cut by each disc, except the last one, being filled in by the succeeding discs.

Assuming now that the tractor-and-plow assembly comes to the end of a passage across a field or along a terrace, and it is desired to reverse the direction of travel, the tractor will be guided to the right, and the latch dog 71 will be manually released, permitting the roller 67 to run across the inner face of the curved tow bar 56. As the tractor continues to circle to the right, the roller will over-run the right-hand latch dog 71 and become automatically latched in position near the right-hand end of the tow bar. The links 57 will then be swung from their position relative to the front frame bar illustrated in Figure 1, to the position illustrated in Figure 8, and during this swinging movement of the links, the left-hand end of the front frame member 27 will be raised, and the right-hand end of this frame member lowered by reason of the skewed hinge connections between the rear ends of the links 57 and the corresponding ends of the frame member 27 and the downward component of the tractive force exerted on the hitch structure of the plow by the tractor hitch bar and the hitch 64. As the links are swung about their pivotal connections with the front frame member 27, the angularity of the disc gang 14 to the line of traction will be shifted from that illustrated in Figure 1 to that illustrated in Figure 8. The front end of the disc gang is to be right-hand side of the line of traction in Figure 1, and shifts over to the left-hand side of the line of traction when the plow is reversed from the condition illustrated in Figure 1, to that illustrated in Figure 8. As the tractor completes a half-circle turn and the plow is again brought into line directly behind it, the plow will be in the operating position illustrated in Figure 8, with the right-hand ground wheel 15 in contact with the ground, and the right-hand leg of the rear frame member 25 substantially parallel to the line of traction between the tractor and the plow. The right-hand, rear guide wheel 39, and the right-hand, front guide wheel 49 will be brought into engagement with the steep sides of the furrows at the opposite sides of the plow, and the left-hand, rear and front guide wheels, and the left-hand ground wheel 16 will be elevated above the ground to a temporarily inoperative position. The discs 29 will then engage the ground at their sides opposite the ground-engaging sides of these discs when the plow is in the position illustrated in Figure 1.

Although the plow is traveling in the opposite direction when in the operative position illustrated in Figure 8, from the direction of travel illustrated in Figure 1, it will move the plowed earth in the same direction in both directions of travel, and can be used effectively for building terraces or for continuously moving the earth in an uphill direction on terraces already built, or on slopes which are being contour plowed. The operation of the plow is exactly the same in both directions of travel, and the durability of the plow is greatly increased by providing duplicate guide and supporting wheels, since only one wheel of each pair of such wheels is in operative engagement with the ground at any one time.

When the plow reaches the end of the passage in the direction illustrated in Figure 8, the tractor will be turned to the left, moving the hitch 64 over to the left-hand end of the tow bar 56, and returning the plow to the condition illustrated in Figure 1, and described above.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A reversible disc plow comprising a frame, a disc gang disposed below said frame, means connecting said disc gang to said frame for rotation of said disc gang about its longitudinal axis, a pair of supporting wheels carried by said frame at respectively opposite sides thereof, a rear guide wheel truck pivotally connected to said frame at the rear end of the latter and projecting rearwardly from said frame, a front wheel truck pivotally connected to the front end of said frame and projecting forwardly of the latter, a quadrilateral towing structure pivotally connected to the front end of said frame and connecting said plow to traction means, said towing structure including an elongated tow bar having a tractor hitch seat near each opposite end thereof, a tractor hitch slidably mounted on said tow bar and movable from one to the other end of said tow bar whenever said plow is turned to reverse its direction of travel, and means connecting said front guide wheel truck to said towing structure to maintain said truck in position such that its path of travel is substantially parallel to the line of traction from said traction means to said plow, said towing structure being effective to tilt said frame as the tractor hitch moves from one end of said tow bar to the other to bring the supporting wheel at the corresponding side of the frame into engagement with the ground and simultaneously lift the other supporting wheel out of contact with the ground.

2. A reversible plow including a gang of mutually aligned, sequentially-arranged plow elements and a frame carrying said gang of plow elements at an acute angle relative to the draft line of said plow to render said plow elements operative to move earth in one direction laterally of said plow, ground-engaging guide means carried by said frame to support said plow against lateral movement incident to the reaction to the earth-moving effort of said plow elements, ground-engaging support means carried by said frame at respectively opposite sides of said gang of plow elements to alternately support said frame during movements of said plow in opposite directions, and draft means connected to the front end of said frame and connectible to traction means for transmitting the tractive effort of traction means to the plow, said frame including a transversely-disposed front frame member, and said draft means comprising a tow bar spaced from and substantially parallel to said front frame member, pivoted links connecting said tow bar at its opposite ends to the corresponding opposite ends of said front frame member, and a hitch surrounding said tow bar and slidable from one end to the other of said tow bar when said plow is turned to reverse the direction of travel thereof, to thereby shift the position of the draft line of the plow relative to said gang of plow elements from one side to the opposite side of the latter.

3. A reversible plow including a gang of mutually aligned, sequentially-arranged plow elements and a frame carrying said gang of plow elements at an acute angle relative to the draft line of said plow to render said plow elements operative to move earth in one direction laterally of said plow, ground-engaging guide means carried by said frame to support said plow against lateral movement incident to the reaction to the earth-moving effort of said plow elements, ground-engaging support means carried by said frame at respectively opposite sides of said gang of plow elements to alternately support said frame during movements of said plow in opposite directions, and draft means connected to the front end of said frame and connectible to traction means for transmitting the tractive effort of traction means to the plow, said frame including a transversely-disposed front frame member, and said draft means comprising a tow bar spaced from and substantially parallel to said front frame member, links pivotally connected at their front ends to said tow bar near the opposite ends of the latter, hinge joints between the rear ends of said links and the respectively opposite ends of said front frame member, and a hitch clip surrounding said tow bar and slidable lengthwise of the latter when said traction means is turned to reverse the direction of travel thereof, to thereby shift the position of the draft line from one side to the other of the front end of said gang of plow elements, said hitch clip being effective to swing said links about said respective hinge joints to reverse the angular relationship of said links relative to said front frame member, and said hinge joints having skewed axes to tilt said frame in a direction to bring the supporting means at the same side of the front end of said gang of plow elements as said draft line into ground-engaging position.

4. A reversible plow including a gang of mutually aligned, sequentially-arranged plow elements and a frame carrying said gang of plow elements at an acute angle relative to the draft line of said plow to render said plow elements operative to move earth in one direction laterally of said plow, ground-engaging guide means carried by said frame to support said plow against lateral movement incident to the reaction to the earth-moving effort of said plow elements, ground-engaging support means carried by said frame at respectively opposite sides of said gang of plow elements to alternately support said frame during movements of said plow in opposite directions, and draft means connected to the front end of said frame and connectible to traction means for transmitting the tractive effort of traction means to the plow, said frame including a transversely-disposed front frame member, and said draft means comprising a tow bar spaced from and substantially parallel to said front frame member, pivoted links connecting said tow bar at its opposite ends to the corresponding opposite ends of said front frame member, and a hitch clip surrounding said tow bar and slidable from one end to the other of said tow bar when said traction means is turned to reverse the direction of travel of the plow, to thereby shift the position of the draft line of the plow relative to said gang of plow elements from one side to the opposite side of the latter, and said hitch clip including an anti-friction roller engaging the rear surface of said tow bar to reduce frictional resistance to movement of said clip lengthwise of said tow bar.

5. A reversible plow including a gang of mutually aligned, sequentially-arranged plow elements and a frame carrying said gang of plow elements at an acute angle relative to the draft line of said plow to render said plow elements operative to move earth in one direction laterally of said plow, ground-engaging guide means carried by said frame to support said plow against lateral movement incident to the reaction to the earth-moving effort of said plow elements, ground-engaging support means carried by said frame at respectively opposite sides of said gang of plow elements to alternately support said frame during movements of said plow in opposite directions, and draft means connected to the front end of said frame and connectible to traction means for transmitting the tractive effort of traction means to the plow, said draft means including means effective to reverse the angular position of said gang of plow elements relative to the draft line of said plow upon turning of the traction means to reverse the direction of travel of the plow, and said ground-engaging support means comprising frame arms extending laterally at respectively opposite sides of the longitudinal center line of said frame, and a ground-engaging wheel carried by each frame arm at the outer ends of the latter.

6. A reversible plow including a gang of mutually aligned, sequentially-arranged plow elements and a frame carrying said gang of plow elements at an acute angle relative to the draft line of said plow to render said plow elements operative to move earth in one direction laterally of said plow, ground-engaging guide means carried by said frame to support said plow against lateral movement incident to the reaction to the earth-moving effort of said plow elements, ground-engaging support means carried by said frame at respectively opposite sides of said gang of plow elements to alternately support said frame during movements of said plow in opposite directions, and draft means connected to the front end of said frame and connectible to traction means for transmitting the tractive effort of traction means to the plow, said draft means including means effective to reverse the angular position of said gang of plow elements relative to the draft line of said plow upon turning of the traction means to reverse the direction of travel of the plow, said frame including a transversely-disposed front frame member, and said draft means comprising a tow bar spaced from and substantially parallel to said front frame member, links pivotally connected at their front ends to said tow bar near the opposite ends of the latter, hinge joints between the rear ends of said links and the respectively opposite ends of said front frame member, and a hitch clip surrounding said tow bar and slidable lengthwise of the latter when said traction means is turned to thereby shift the position of the draft line from one side to the other of the front end of said gang of plow elements, said hitch clip being effective to swing said links about said respective hinge joints to reverse the angularity of said links relative to said front frame member, and said hinge joints having skewed axes to tilt said frame in a direction to bring the supporting means at the same side of the front end of said gang of plow elements as said draft line into ground-engaging position, said ground-engaging support means comprising frame arms extending laterally at respectively opposite sides of the longitudinal center line of said frame, and a ground-engaging wheel carried by each frame arm at the outer end thereof, said wheels being positioned relative to the longitudinal center line of said frame so that the ground-contacting wheel for each direction of travel of the plow has its plane of rotation substantially parallel to the draft line of the plow.

7. A reversible plow including a gang of mutually-aligned, sequentially-arranged plow elements and a frame carrying said gang of plow elements at an acute angle relative to the draft line of said plow to render said plow elements operative to move earth in one direction laterally of said plow, ground-engaging guide means carried by said frame to support said plow against lateral movement incident to the reaction to the earth-moving effort of said plow elements, ground-engaging support means carried by said frame at respectively opposite sides of said gang of plow elements to alternately support said frame during movements of said plow in opposite directions, and draft means connected to the front end of said frame and connectible to traction means for transmitting the tractive effort of traction means to the plow, said draft means including means effective to reverse the angular position of said gang of plow elements relative to the draft line of said plow upon turning of the traction means to reverse the direction of travel of the plow, and said ground-engaging guide means comprising a rear guide wheel truck pivotally connected to the rear end of said frame and extending rearwardly from the latter, and a front guide wheel truck pivotally connected to the front end of said frame and extending forwardly from the latter.

8. A reversible plow including a gang of mutually aligned, sequentially-arranged plow elements and a frame carrying said gang of plow elements at an acute angle relative to the draft line of said plow to render said plow elements operative to move earth in one direction laterally of said plow, ground-engaging guide means carried by said frame to support said plow against lateral movement incident to the reaction to the earth-moving effort of said plow elements, ground-engaging support means carried by said frame at respectively opposite sides of said gang of plow elements to alternately support said frame during movements of said plow in opposite directions, and draft means connected to the front end of said frame and connectible to traction means for transmitting the tractive effort of traction means to the plow, said draft means including means effective to reverse the angular position of said gang of plow elements relative to the draft line of said plow upon turning of the traction means to reverse the direction of travel of the plow, and said ground-engaging guide means comprising a rear guide wheel truck pivotally connected to the rear end of said frame and extending rearwardly from the latter and a front guide wheel truck pivotally connected to the front end of said frame and extending forwardly from the latter, said rear guide wheel truck having duplicate guide wheels disposed in side-by-side, upwardly-and-forwardly-converging relationship, and said front guide wheel truck having duplicate guide wheels disposed in side-by-side, upwardly-and-rearwardly-converging relationship to bring one rear and one front guide wheel substantially into parallelism with the draft line of the plow for each direction of travel of the plow.

9. A reversible plow including a gang of mutually-aligned, sequentially-arranged plow elements and a frame carrying said gang of plow elements at an acute angle relative to the draft line of said plow to render said plow elements operative to move earth in one direction laterally of said plow, ground-engaging guide means carried by said frame to support said plow against lateral movement incident to the reaction to the earth-moving effort of said plow elements, ground-engaging support means carried by said frame at respectively opposite sides of said gang of plow elements to alternately support said frame during movements of said plow in opposite directions, and draft means connected to the front end of said frame and connectible to traction means for transmitting the tractive effort of traction means to the plow, said draft means including means effective to reverse the angular position of said gang of plow elements relative to the draft line of said plow upon turning of the traction means to reverse the direction of travel of the plow, said ground-engaging guide means comprising a rear guide wheel truck pivotally connected to the rear end of said frame and extending rearwardly from the latter and a front guide wheel truck pivotally connected to the front end of said frame and extending forwardly from the latter, said rear guide wheel truck having duplicate guide wheels disposed in side-by-side, upwardly-and-forwardly-converging relationship, and said front guide wheel truck having duplicate guide wheels disposed in side-by-side, upwardly-and-rearwardly - converging relationship to bring one rear and one front guide wheel substantially into parallelism with the draft line of the plow for each direction of travel of the plow, stop means secured to said frame at the rear end of the latter and engaging said rear guide wheel truck to limit pivotal movement of said truck relative to said frame, and means connected between said front guide wheel truck and said draft means limiting pivotal movement of said front guide wheel truck relative to said frame.

10. A reversible plow including a gang of mutually-aligned, sequentially-arranged plow elements and a frame carrying said gang of plow elements at an acute angle relative to the draft line of said plow to render said plow elements operative to move earth in one direction laterally of said plow, ground-engaging guide means carried by said frame to support said plow against lateral movement incident to the reaction to the earth-moving effort of said plow elements, ground-engaging support means carried by said frame at respectively opposite sides of said gang of plow elements to alternately support said frame during movements of said plow in opposite directions, and draft means connected to the front end of said frame and connectible to traction means for transmitting the tractive effort of traction means to the plow, said draft means including means effective to reverse the angular position of said gang of plow elements relative to the draft line of said plow upon turning of the traction means to reverse the direction of travel of the plow and said ground-engaging guide means comprising a rear guide wheel truck pivotally connected to the rear end of said frame and extending rearwardly from the latter and a front guide wheel truck pivotally connected to the front end of said frame and extending forwardly from the latter, and manually-operated means connected between said rear and said front guide wheel trucks and said frame for raising and lowering said frame and said gang of plow elements.

11. A reversible disc plow comprising a frame, a disc gang positioned below said frame and extending longitudinally thereof, means inter-connecting said frame and said disc gang for free rotation of the latter about its own longitudinal axis, a rear guide wheel truck pivotally connected to the rear end of said frame and disposed rearwardly of the latter, a front guide wheel truck pivotally connected to the front end of said frame and disposed forwardly of the latter, frame-supporting ground wheels carried by said frame at respectively opposite sides of said disc gang, a draft structure pivotally secured to the front end of said frame, said rear guide wheel truck having two guide wheels disposed in upwardly-and-forwardly-converging side-by-side relationship to each other, said front guide wheel truck having two guide wheels disposed in upwardly-converging, forwardly-diverging, side-by-side relationship to each other, said frame including a transverse front frame member and said draft structure including a tow bar substantially parallel to said front frame member, links extending respectively between the opposite ends of said tow bar and the corresponding ends of said front frame member, means pivotally connecting said links at their opposite ends to said front frame member and said tow bar including hinge joints with skewed axes connecting said links to said front frame member for tilting said frame when said links are swung relative to said front frame member to thereby transfer the frame-supporting function from one to the other of said ground wheels and simultaneously shift the plow-guiding function from one to the other of the two guide wheels of each of said guide wheel trucks, and a hitch clip slidable along said tow bar to tow said plow and swing said links relative to said front frame member when said plow is turned to reverse the direction thereof, the swinging of said links by said hitch clip being effective to shift the draft line of said plow from one side to the other of the front end of said disc gang.

12. A reversible disc plow comprising a frame, a disc gang disposed below said frame and extending longitudinally of the latter, means connecting said frame to said disc gang for free rotation of the latter about its own longitudinal axis, duplicate frame-supporting ground wheels carried by said frame at respectively opposite sides of said disc gang, a guide wheel truck pivotally connected to the rear end and a guide wheel truck pivotally connected to the front end of said frame, each of said trucks including a pair of duplicate guide wheels disposed in side-by-side relationship, and draft means pivotally connected to the front end of said frame and movable relative to said frame when said plow is turned to reverse the direction of travel thereof, said draft means being effective to shift the line of traction of said plow from one side to the other of the front end of said disc gang and including means effective to simultaneously transfer the frame-supporting function from one to the other of said ground wheels and the plow-guiding function from one to the other of the duplicate guide wheels of each of said guide wheel trucks.

ROBERT L. McELROY.

REFERENCES CITED

The following references are of record in the file of this patent:

UNITED STATES PATENTS

| Number | Name | Date |
|---|---|---|
| 954,950 | Fowler et al. | Apr. 12, 1910 |
| 971,157 | Smith | Sept. 27, 1910 |
| 1,221,764 | Mansfield | Apr. 3, 1917 |
| 1,945,930 | Birrer | Feb. 6, 1934 |
| 2,158,746 | Dinwiddie | May 16, 1939 |

FOREIGN PATENTS

| Number | Country | Date |
|---|---|---|
| 518,004 | France | Dec. 24, 1920 |
| 780,754 | France | Feb. 11, 1935 |